Jan. 2, 1962     E. C. GITS     3,015,371

LEVEL REGULATOR

Filed June 15, 1959

Inventor
Edward C. Gits

United States Patent Office 3,015,371
Patented Jan. 2, 1962

3,015,371
LEVEL REGULATOR
Edward C. Gits, La Grange, Ill., assignor to Gits Bros.
Mfg. Co., Chicago, Ill., a corporation of Illinois
Filed June 15, 1959, Ser. No. 820,347
1 Claim. (Cl. 184—103)

This invention relates to an oil level regulator for use with a container such as the crank case of a compressor, engine or the like which may in operation develop super-atmospheric or sub-atmospheric pressures therein.

Air compressors are commonly used, for example, by telephone companies and public service companies to pressurize conduit tubes containing electric wires, since with a slight positive pressure in these tubes, it is possible to keep out all moisture and other deteriorating atmospheres. However, such compressors may have to operate continuously without attention, and over very prolonged periods of time. To assure such operation, the present invention makes possible full lubrication of compressor bearings, including both crank shaft bearings and connecting rod bearings, by supplying oil to the crank case so as to maintain a desired constant level therein without any influence from agitation of the oil in the crank case.

The level regulator of the invention includes a main oil reservoir which feeds a small float chamber through a float controlled needle valve. The float chamber communicates with the atmosphere above the oil level in the crank case by means of a pressure stabilization conduit, and with the crank case below the oil level through an oil feed line. The float in the float chamber may be a conventional float cork carrying a needle valve stem, and the axial position of the stem may be readily adjusted by means of a nut threaded on the stem in underlying relationship to the cork. The needle valve is also guided by means of a boss formed at the bottom of the float chamber.

Accordingly, it is an object of the present invention to provide a means for supplying oil to a container which may have variable pressures, such as a compressor crank case or the like, so as to maintain the oil in the container at a constant level.

Another object of the invention is to supply oil at a desired constant level in a compressor crank case or the like in a manner which is free from any influence from agitation of the oil therein.

Another object of the invention is to provide a device as described wherein compressor bearings, including both the crank shaft bearings and the connecting rod bearings, may be lubricated without any manual attention being required.

Another object of the invention is to provide an oil supply means as described, wherein the oil is introduced to a small float chamber from a main oil reservoir which is vented to the atmosphere, with the oil in the float chamber being accurately controlled by needle valve means including an adjustable cork for a needle valve stem and a guide boss at the bottom of the float chamber.

Yet another object of the invention is to provide an oil level regulator as described wherein the float chamber is vented to the container, or compressor crank case, both above and below the oil lever in the container.

Other objects and advantages of the invention will become aparent as the description proceeds in accordance with the drawings, wherein.

Figure 1:
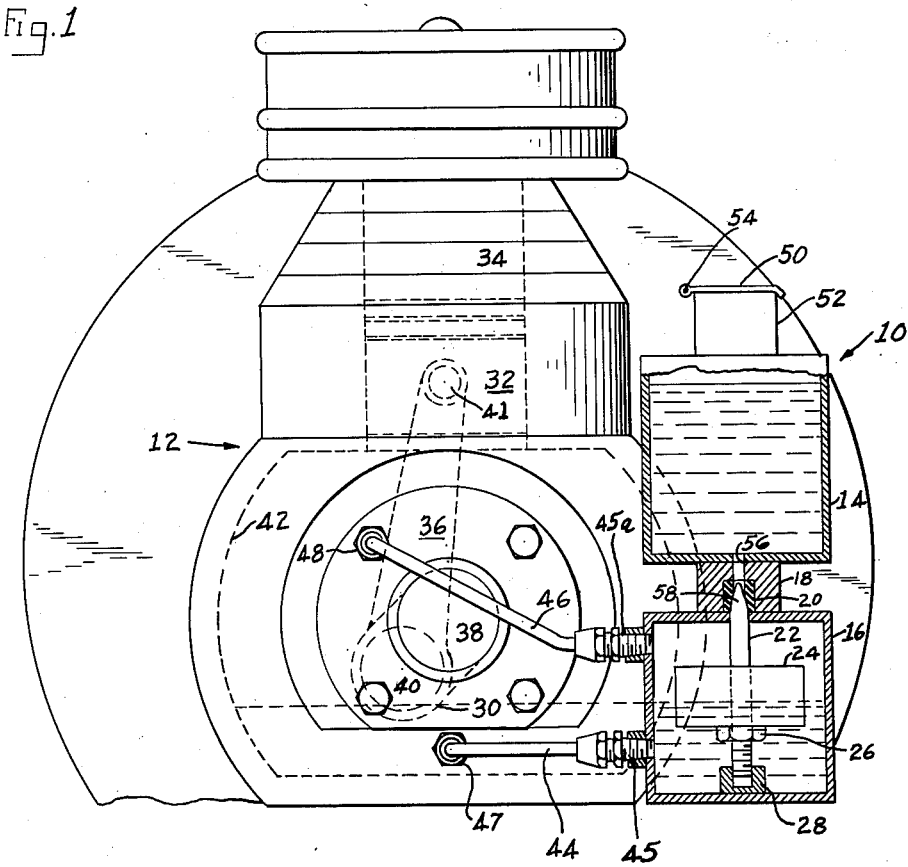
FIGURE 1 is a front elevational view, partly in vertical section, of a compressor and oil supply and level regulator means according to the invention.
Figure 2:
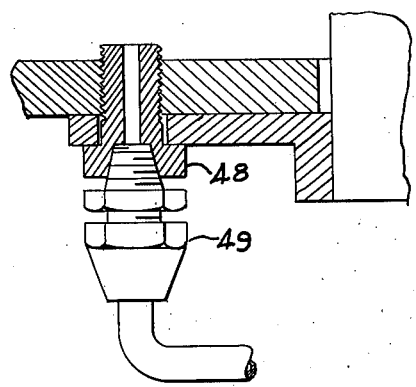
FIGURE 2 is an enlarged fragmentary, vertical sectional view of a connection for a conduit connecting the regulator and compressor.

Referring now to the drawings, an oil level regulator 10 is shown which supplies oil to a compressor 12 such as may be used for pressurizing conduit tubes containing electric wires so as to keep out moisture or the like, and it will be understood that other types of compressors, engines or containers which are subject to variable pressures may be regulated by the regulator 10. The regulator comprises an oil reservoir 14, and a relatively small level regulator float chamber 16 which may support the reservoir by means of a sleeve or the like 18, in which is formed a valve means 20 communicating with the reservoir and float chamber. A needle valve 22 extends into the valve means 20 and is carried by a float 24 which may be of a conventional type, as for example, a cork float. However, the axial position of the float 24 on the needle 22 is determined by a nut 26 or the like threadedly secured to the needle in underlying relation to the float. A guide boss 28 is formed at the bottom of the float chamber to slidably receive the needle valve 22, to maintain it in proper coaxial alignment with the valve means 20.

Figure 3:
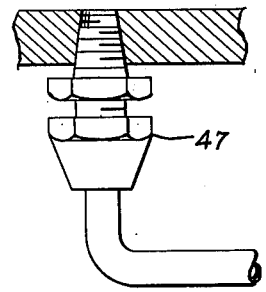
FIGURE 3 is a similar view illustrating a connection for an oil feed conduit.

The compressor 12, in the example shown, includes a crankshaft 30 for driving a piston 32 in a cylinder 34, by means of a connecting rod 36, and in order to lubricate the compressor bearings, including the crankshaft bearings 38 and the connecting rod bearings 40 and 41, the crankcase 42 is supplied with oil which is maintained at a desired level by the regulator 10. Thus, a conduit or oil delivery line 44 communicates with the level regulator float chamber 16 below the oil line thereof and introduces oil to the crankcase below the oil level therein. The conduit 44 as seen in FIGS. 1 and 3, is provided with suitable adapter studs 45 and 47.

In use, super-atmospheric or sub-atmospheric pressures may develop in the crankcase 42. Thus, a vacuum condition in the crank case would immediately suck the oil from the float chamber 16 and reservoir 14 into the crankcase, unless this condition were stabilized by equalizing the pressure in the crankcase and in the float chamber.

To this end, a pressure stabilization line or conduit 46 extends from the upper portion of the float chamber 16 above the oil level, to the crankcase 42 at a predetermined distance above the oil level therein. A hollow stud 48 connects the line 46 with the interior of the crankcase to afford communication between the level regulator float chamber 16 and the crankcase 42, by means of an adapter stud 49 threadedly engaging the stud 48 and an adapter stud 45a threadedly engaging the float chamber 16. The float chamber is thus vented to the atmosphere in the crankcase both beneath the oil level and above the oil level therein.

In order to permit the controlled metering of oil from the reservoir 14 into the level regulator float chamber 16, the reservoir is provided with a cover 50 which is adapted to permit a degree of air exchange between the reservoir and the circumambient atmosphere and, for example, the cover may be pivotally mounted on a reduced inlet portion 52 of the reservoir, as by a hinge pin 54 or the like. The valve means 20 in the sleeve or connection element 18 is desirably of rubber or similar resilient material and has a predetermined taper downwardly and outwardly from an inlet passage 56 in the sleeve. The needle 22 is, of course, of a complementary configuration at its tip 58 and the boss 28 at the lower end of the float chamber is configured to permit easy slidable and axial movement of the needle therein. The chamber 16 desirably is mounted on the compressor housing 60 by suitable bolts (not shown) or otherwise secured in fixed position relative to the housing and it will be appreciated that in addition to adjusting the level control of the float by means of the nut 26, level control may be also effected by adjustment of the height of the reservoir on the housing, thereby varying the level of the oil in the reservoir 16 with regard to the crank case 42.

In operation, oil demand from the crank case 42 of the compressor will cause the oil level in the float chamber 16 to drop. The float 24 will then drop proportionately, moving the needle element 22 downwardly and opening the valve 20 to allow oil from the reservoir 14 to refill the float chamber to the initial level and correspondingly supply oil to the crank case through the oil delivery line 44. When the demand has been satisfied and the level in the crank case 42 has risen to the point where the level in the float chamber 16 again causes the needle 22 to close the valve 20, a stabilized condition will be realized which will be maintained until a further demand is created by the lowering of the level of the oil in the crank case 42.

The stabilization of pressure conditions between the crank case and the float chamber afforded by the pressure conduit 46, in cooperation with oil line 44, assures that the desired level will be maintained in the crank case regardless of the agitation of the oil in the crank case produced by operation of the compressor, so that the crank shaft and connecting rod bearings 38 and 40 and 41 will be lubricated without the need for manual attention. Further, this stabilization of super-atmospheric or sub-atmospheric pressures in the crank case with respect to the member 16 assures that the compressor may operate continuously over very long periods of time without maintenance or repair being required. The regulator of the invention is thus suitable for a wide variety of applications and may be utilized wherever containers such as crank cases for engines, compressors, or the like, develop super-atmospheric or sub-atmospheric pressures, to maintain a constant liquid level in the containers despite pressure variation and movement of the liquid in the container.

Although I have herein set forth and described my invention with respect to certain specific principles and details, it will be understood by those skilled in the art that these may be varied without departing from the spirit and scope of the novel invention as set forth in the hereonto appended claim.

I claim as my invention:

A compressor structure for maintaining a substantially unchanging volume of lubricant in a crankcase thereof comprising a compressor including piston means, a crankshaft therefor, a crankcase, and means for maintaining a substantially constant volume in the crankcase comprising a float chamber, means for supplying lubricant to said float chamber, valve means controlling the level of lubricant in said float chamber and including float means for controlling the passage of lubricant from said means supplying lubricant to said float chamber, a first conduit communicating the lower portion of the float chamber below the lubricant level therein with the lower portion of the crankcase, and a second conduit communicating the upper portion of the fluid chamber above the lubricant level therein with the upper portion of the crankcase, said crankcase defining an opening for the second conduit disposed in a plane normal to the axis of rotation of the crankshaft and disposed at a level above any level to which lubricant may be agitated by the crankshaft, thereby to provide communication of atmosphere between the float chamber and the crankcase and to prevent circulation of fluid between the float chamber and the crankcase so as to continuously and uninterruptedly equalize pressure conditions in the float chamber and the crankcase.

References Cited in the file of this patent

UNITED STATES PATENTS

| | | |
|---|---|---|
| 1,340,687 | Schell | May 18, 1920 |
| 1,541,866 | Sorensen | June 16, 1925 |
| 2,646,212 | Kellie | July 21, 1953 |
| 2,886,056 | Ratliff | May 12, 1959 |

FOREIGN PATENTS

| | | |
|---|---|---|
| 185,628 | Great Britain | Sept. 14, 1922 |